Oct. 12, 1926.
J. M. NAIMAN
FLUID METER
Filed June 16, 1919     3 Sheets-Sheet 1
1,602,444
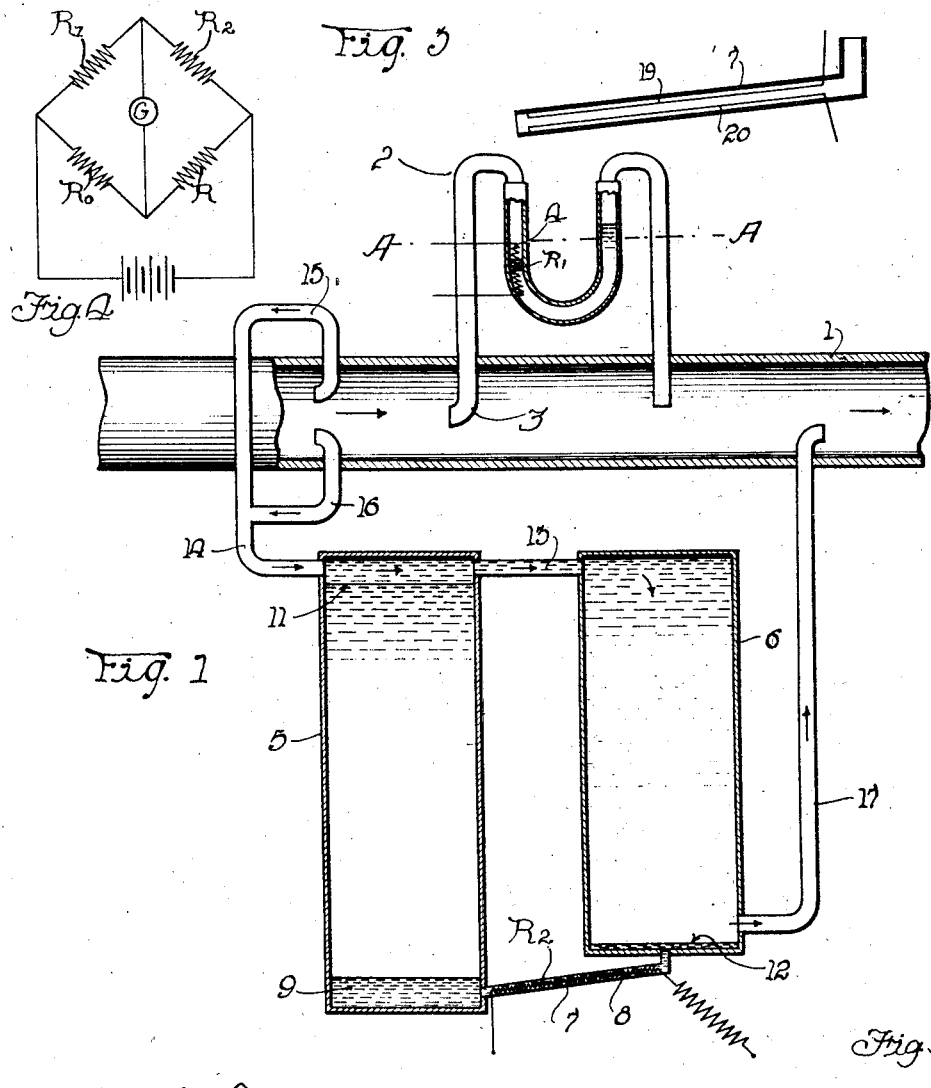
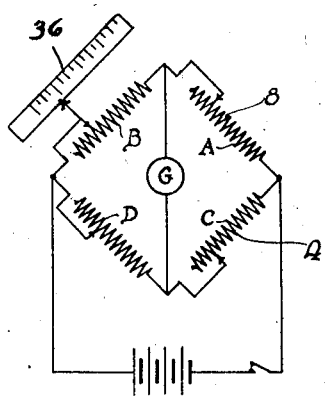
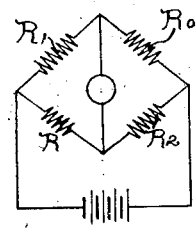
Inventor
Julius M Naiman
By Brown Boettcher & Dienner
Attorneys

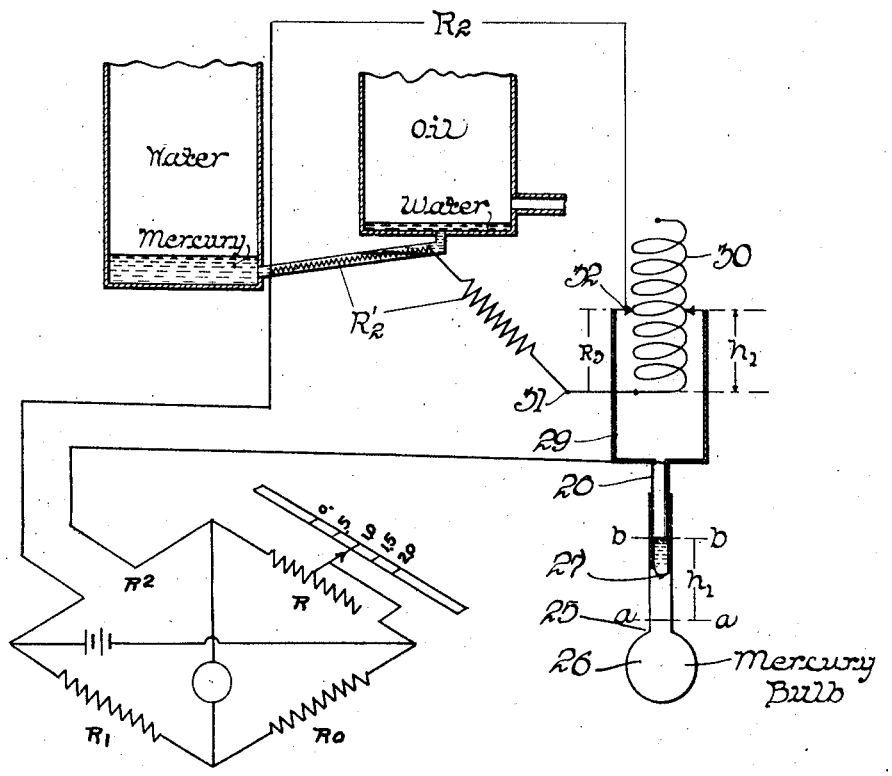

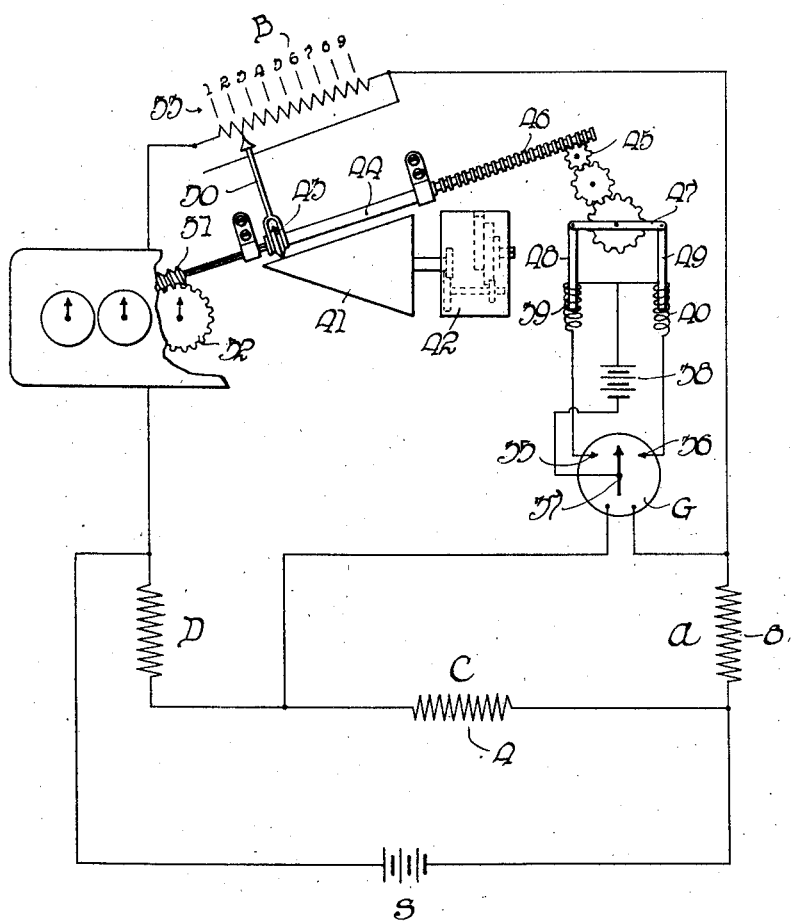

Patented Oct. 12, 1926.

1,602,444

UNITED STATES PATENT OFFICE.

JULIUS M. NAIMAN, OF CHICAGO, ILLINOIS.

FLUID METER.

Application filed June 16, 1919. Serial No. 304,410.

My invention relates to fluid meters.

The theory of measuring fluid flow is simple but in practice difficulties are encountered which make the measurement of flow of fluid thru a pipe a very difficult matter.

Assume that an orifice of known area of A square feet is provided and that the fluid flows thru the same at a velocity of S feet per second. Then the volume V in cubic feet per second will be represented by the equation $$V = SA. \quad (1)$$

Now assume a constant density of D pounds per cubic foot. Then the weight W in pounds per second is represented by $$W = VD \quad (2)$$

or $$W = SAD \quad (3)$$

But the practical difficulty that arises is the accurate measurement of the velocity. Heretofore it has been customary to provide a Pitot tube upon the mouth of which the moving fluid impinges. Also another tube was usually provided, with its mouth parallel to the flow, to measure the static pressure to which the fluid is subjected. The difference of pressure which prevails between the two tubes is a measure of the velocity of flow and may be accurately represented by a column of fluid of the same density under the well known formula, $$S^2 = 2gh. \quad (4)$$

where $g$ is the acceleration due to gravity in terms of feet per second and $h$ is the height in feet.

Since it is impracticable to use a column of fluid of the same density as the fluid whose flow is to be measured, the variable measured is the difference of pressure $$P = P_1 - P_2 \quad (5)$$

where $P_1$ is the pressure at the Pitot tube, usually termed the dynamic pressure and $P_2$ is the static pressure at the static tube. The relation between P and h is $$P = hD \quad (6)$$

where D is the density of the fluid whose flow is to be measured.

Equation (4) now becomes, $$S^2 = 2g \frac{P}{D} \quad (7)$$

or $$S = 8\sqrt{\frac{P}{D}} \quad (8)$$

if the quantities are expressed in F. P. S. units, so that $g = 32.2$ ft. per second.

Equation (1) becomes, $$V = 8A\sqrt{\frac{P}{D}} = K\frac{\sqrt{P}}{\sqrt{D}} \quad (9)$$

and equation (3) becomes, $$W = 8AD\sqrt{\frac{P}{D}} = K\sqrt{P}\sqrt{D} \quad (10)$$

where $K = 8A$ is a constant for any given pipe.

If either the volume of flow V or the weight of flow W is to be determined by simply measuring P, an assumption must be made that the density D remains constant. Obviously this is an assumption which is generally unwarranted and the extent of the error may be judged from the knowledge of the expansion and contraction due to the changes of pressure and temperature alone. In the case of fluids which have variable constituents or variable amounts of soluble matter in solution the error is further increased.

If the density could be determined then it would be possible to make accurate measurements.

It is the aim of my invention to provide a novel means for measuring the density of fluids particularly in connection with the measurement of flow. I term the device an hydrometer, but do not intend to limit it to the use of measuring liquids, as it is equally applicable to the measurement of vapors and gases or mixtures of them. Hence it is more accurately a fluid density meter.

In the specific embodiment which I shall describe in detail I employ the device for measuring the flow of gasoline in pipes.

Primarily I provide a pair of vessels of different heights connected together at top and bottom. The bottom of one vessel is above the bottom of the other. In the connection between the lower ends of the vessels I provide a body of mercury or the like and this extends part way up in the connection between the lower ends of the vessels. This connection extends partly in a vertical direction so that the mercury may rise and fall in the same. An electrical resistance is placed in this connection and is subject to being short circuited to a greater or less degree by the rise and fall of the mercury therein. In the two vessels the weight of a known liquid is balanced against a column of the liquid to be measured and the force required to maintain the balance causes a variation of the column of mercury in the said connecting tube.

Consequently the variations of density may be indicated or evidenced by the electric circuit containing the said resistance.

It is possible to combine a plurality of factors electrically thru the medium of a Wheatstone bridge, this being obvious from the law of the Wheatstone bridge represented by the familiar equation $$\frac{R^1}{R^0} = \frac{R}{R^2}$$

More particularly, let one resistance $R_1$ be made to vary directly as the difference of pressure P, i. e., let $$P = K_1 R_1 \quad (11)$$

and let another resistance $R_2$ be made to vary directly as the density D, i. e., let $$D = K_2 R_2 \quad (12)$$

Also, let these two resistances $R_1$, $R_2$, a constant resistance $R_0$ and a rheostat R be made the arms of a Wheatstone bridge. Then if $R_1$ and $R_2$ are arranged in opposite arms as shown in Figure 5, and the bridge is in balance, the following relation evidently holds:

$$R_1 R_2 = R_0 R \quad (13)$$

and $$W = K \sqrt{PD} = K \sqrt{K_1 K_2 R_1 R_2} = K \sqrt{K_1 K_2 R_0 R} = K_3 \sqrt{R} \quad (14)$$

Therefore, by measuring the rheostat resistance R we have a direct measurement of the weight of flow W.

Again, if $R_1$ and $R_2$ are arranged in adjacent arms in contact with each other as shown in Figure 4 so that, $$\frac{R_1}{R_2} = \frac{R_0}{R} \quad (15)$$

we get $$V = K \sqrt{\frac{P}{D}} = K \sqrt{\frac{K_1 R_1}{K_2 R_2}} = K \sqrt{\frac{K_1 R_0}{K_2 R}} = K_4 \sqrt{\frac{1}{R}} \quad (16)$$

In this case R is a direct measurement of the volume of flow V.

I prefer to employ my meter in connection with known or any preferred means for measuring velocity and pressure to secure the result of equations (14) or (16) by means of a Wheatstone bridge.

I believe that I am the first to provide a density meter actuated directly by density or specific gravity in connection with a flow meter.

In order to acquaint those skilled in the art with one manner of practicing my invention, in the accompanying drawings:

Figure 1 is a sectional view, partly diagrammatic of an embodiment of my invention;

Figure 2 is a diagram of the electrical connections for the same;

Figure 3 is a sectional view of a modification employing two resistance wires.

Figure 4 is a diagram illustrating an arrangement of the resistance when it is desired to measure the volume of the fluid per unit of time.

Figure 5 is a diagram illustrating an arrangement for measuring the weight of fluid per unit of time.

Figure 6 is a diagrammatic showing of the means for correcting the value of resistance $R_2$ for temperature variations, and Figure 7 is a diagram illustrating a system by means of which integration may be accomplished.

As shown in Figure 1, the conduit or pipe 1 in which the liquid to be measured or the fluid to be measured is flowing, is provided with suitable mechanism for determining the pounds of fluid passing therethru in a given period.

The cross-section of the pipe 1 may be previously determined or an orifice of a predetermined size may be connected in such manner that the area of the orifice or pipe may be accurately determined for the purposes of the above equations. I provide a pressure meter 2 which may be of any preferred or usual construction, which pressure meter is connected by a suitable tube 3 for receiving the pressure prevailing within the pipe 1 due to the flow of the fluid therein. The pressure meter 2 is provided with a resistance 4 which is adapted to be included to a greater or less extent in accordance with the variations of pressure due to the impact of the fluid upon the open mouth of the tube 3.

The construction above described is well known to the prior art and I do not claim novelty in only so much as above described. In order to secure an accurate reading of flow, it is necessary, as I have above pointed out, to secure a determination of the density of the fluid whether it be a liquid, gas, vapor or the like.

Instead of employing the Pitot tube 3 and measuring the velocity of flow thereby, it is possible to use any other preferred or desired means for securing a reading of the pressure due to the velocity of the fluid.

The density meter which I have illustrated comprises the two vessels 5 and 6, the tops of which may be substantially on the same level, and the lower ends of which are connected by an inclined tube 7 within which tube I provide a resistance wire 8. The bottom of the tube 5 and a portion of the inclined connecting tube 7 are filled with a conducting liquid for short circuiting the resistance wire 8 to a greater or less extent. In the present instance I employ the body of mercury 9 for accomplishing this purpose.

The mercury 9 is insulated from the liquid to be measured—in this case gasoline—by means of a body of liquid—in this case distilled water—employed to insulate or separate the body of mercury 9 from the gasoline in the vessels 5 and 6. The water in the vessel 5 extends upward to the level 11 and the water in the vessel 6 extends to the level 12. It can now be seen that the body of gasoline fills substantially the entire vessel 6 and fills the upper part of the vessel 5.

The two vessels are connected together at their upper ends by a connection 13 and the vessel 5 is connected at its upper end by the pipe 14 to the interior of the main pipe or conduit 1 as by means of the double connection 15—16 to equalize the grades of liquid flowing into the vessels 5 and 6 from the pipe 14. The lower end of the vessel 6 is connected by a pipe 17 to the interior of the pipe 1 and these pipes are so arranged that liquid entering the connection 14 will be passed thru the vessels 5 and 6 so that the liquid or fluid therein may be constantly changed in order to take account of variations occurring within the pipe 1. Thus a representative body of the liquid is always contained within the vessels 5 and 6 and as this is constantly being changed in accordance with the rate of flow in the main pipe 1, the results are accurate to a very high degree.

The resistance 8 is preferably connected in an electric circuit of such a character that the density may co-operate with the variations in rate of flow so that an accurate reading of the quantity in pounds flowing thru the pipe may be determined. It is obvious that if density alone is desired, the variations in resistance of the wire 8 may be recorded in terms of variations of density which will give an accurate record of the variations in density.

However, it is usually desirable to employ the variations in density in making up a reading of the quantity of fluid flowing thru the pipe and to this end I preferably combine the resistance 8 with the resistance 4 in an electric circuit in such manner as to secure the resultant of the two or more factors.

I shall now show how a resistance $R_2$ such as the resistance 8 can be made to vary in direct proportion to the density D.

From an inspection of Figure 1, it is apparent that if the fluid were stationary and of the same density $D_w$ as the insulating fluid, distilled water in this case, the mercury would be at the same level on both sides of the U-tube; i. e., in this case there would be no difference of level $h$, or when $D=D_w$, $h=o$. If, however, the fluid is lighter than water, the latter will force the mercury up the tube 7, to a height $h$ above the mercury level in the vessel 5, the height $h$ evidently being proportional to difference of densities $D_w-D$. Therefore, $$D_w-D=K_5 h \quad (17)$$

or $$D=D_w-K_5 h \quad (18)$$

The fluid is flowing instead of being stationary but this does not materially affect the pressure relation and for all practical purposes the equation (18) still holds true.

The only purpose of the flow through the tubes 13—17 is to secure continously a fresh sample. This flow is secured from those parts of the cross section of the pipe where the velocity is minimum. The frictional losses are negligible for my purposes.

Now, let the total resistance of the density controlled resistance be $R_e$ in tube 7 when the mercury level is the same on both sides of the U-tube 9—7, i. e., when $h=o$, or $D=D_w$. Then as $h$ increases, resistance is cut out by the rise of mercury or the resistance $R_2$ gets less. Therefore, $$R_2=R_e-Ch \quad (19)$$

where C is the resistance per unit height of the U-tube.

In order that we may have the relation $$D=K_2 R_2=K_2 R_e-K_2 Ch \quad (20)$$

we must have the relation $$K_2 R_e=D_w \quad (21)$$

and $$K_2 C=K_5 \quad (22)$$

Now if we find $K_2$ from equation (22) and substitute its value in equation (21), we get, $$R_e=\frac{D_w}{K_2}=\frac{C}{K_5}D_w \quad (23)$$

It can be shown (see equation 17) that $$K_5=\frac{D_m-D_w}{H_2} \quad (24)$$

where $D_m$=the density of mercury and $H_2$= the distance between levels 11 and 12. This will be apparent from the following:

On the right side of the tube 7, the rise of mercury to a height $h$ produces an excess pressure of $$h(D_m - D_w) \quad (24^A)$$

This is balanced by an excess pressure on the left side caused by the difference between the density of the water $D_w$ and the variable density of the oil $D$ and equal to $$H_2(D_w - D) \quad (24^B)$$

where $H_2$ is the distance between the mean bottoms of the flowing fluids on the two sides of the hydrometer, i. e., between levels 11 and 12. We have then $$h(D_m - D_w) = H_2(D_w - D) \quad (24^C)$$

Substituting in the last equation $K_5 h$ for $D_w - D$ (from equation 17) we get $$h(D_m - D_w) = K_5 H_2 h \quad (24^D)$$

from which $$K_5 = \frac{(D_m - D_w)}{H_2} \quad (24^E)$$

Therefore, equation (23) becomes $$R_e = C \frac{H_2 D_w}{D_m - D_w} \quad (25)$$

and $$D = K_2 R_2 = \left\{ \frac{D_m - D_w}{C H_2} \right\} R_2 \quad (26)$$

Thus to make $D$ directly proportional to $R_2$ it is sufficient to give $R_e$ the value required by equation (25).

The variations in pressure difference, P can be made to cause directly proportional variations of the resistance $R_1$. The variations in pressure are made to operate upon the mercury in the U tube. Each increase in pressure which causes a proportionate increase in difference of level $h$ will correspond to only a drop of level $\frac{h}{2}$ on the side where the high pressure is applied.

Since the resistance $R_1$ is terminated at the point marked by the mercury where it is not subjected to any difference of pressure, line A—A in Figure 1, we evidently have $$R_1 = C_1 \frac{h}{2} \quad (27)$$

where $C_1$ equals the resistance per unit length of coil or wire 4 in the left arm of the U tube shown at the top of Figure 1. Also $$P = D_m h \quad (28)$$

when $D_m$ equals density of mercury. Combining the two equations (27), (28) we have $$P = D_m \frac{2}{C_1} R_1 = K_1 R_1 \quad (29)$$

Equation 29 shows that the resistance $R_1$ can be made directly proportional to the pressure difference P. In the present instance this is accomplished by mounting the resistance wire 4, that is resistance $R_1$ in one leg of the U tube T in such manner as to extend up even with the level of mercury M contained therein, as indicated in Figure 1, when the mercury in both the vessel 5 and tube 7 are at the same height. The pressure in tube 3, due to the impact of the fluid flowing in pipe 1, is transmitted to the surface of the mercury in one leg of the U tube while the mercury in the other leg is subject to the drop of pressure caused by flow of the liquid. This difference of pressure, which is termed P, effects a corresponding adjustment of the column of mercury with the result that the resistance wire 4 is partially inserted and its effective resistance $R_1$ varies directly in proportion to the flow pressure P.

Thus when it is desired to obtain a measurement of the volume of a fluid passing through a conduit the pressure controlled resistance $R_1$ and the density controlled resistance $R_2$ are placed in adjacent arms of a Wheatstone bridge as indicated in Figure 4. Resistance $R_0$ in this figure is a constant resistance while resistance $R$ is a rheostat, the value of which when the bridge is balanced is a measure of the volume of the fluid flowing per unit of time. (See equation 16 above.)

On the other hand when it is desired to obtain a measurement of the weight of the fluid the pressure controlled resistance $R_1$ and the density controlled resistance $R_2$ are placed in opposite arms of the bridge, as indicated in Figure 5. With this arrangement the value of the resistance $R$ of the rheostat when the bridge is balanced is a measure of the weight of the fluid flowing per unit of time. (See equation 14 above.)

I shall now show how the error due to expansion or contraction of the mercury because of temperature may be corrected.

Evidently if the temperature rises from the value taken as a standard, resistance is cut out and $R_2$ becomes smaller than what it should be. Another resistance $R_3$ must then be added in series with $R_2$ and must be made to vary with temperature in such a manner as to offset the loss of resistance just mentioned. Since this decrease in resistance is proportional to the rise in the mercury level, which in turn is proportional to the increase in temperature, the compensating resistance $R_3$ must be made proportional to the temperature rise. Thus, we must have $$R_3 = K_6 (t - t_o) \quad (30)$$

where $t_o$ is the lowest temperature at which the device is called upon to operate and is therefore taken as a standard.

To accomplish this we can use a mercury bulb 25 (Fig. 6) with a sufficiently large vertical tube 27, a closely fitting piston 28 being inserted into the tube. The piston may be solidly attached to a slider 29 which can move up and down a rheostat 30. If at the lowest possible temperature of operation $t_0$ the mercury level is at $a$—$a$ it will rise through a height $h_1$ to level $b$ moving the slider along the rheostat for a length $h_1$.

The result will be that the resistance $R_3$ between contacts 31 and 32 will be proportional to the height $h_1$ and therefore also proportional to the difference in temperature $(t-t_0)$ i. e.

$$R_3 = K_6(t-t_0) \quad (30)$$

as required. By proper design the constant $K_6$ may be made of such value that the decrease of the hydrometer resistance $R_2$ will be exactly compensated by connecting $R_3$ in series with $R_2$.

As shown in Figure 3 the resistance 8 may be constructed in the form of two separate resistances 19 and 20 within the tube 7, these resistances being adapted to be connected together by the body of mercury 9. In this way it is possible to secure twice the amount of resistance for a given linear length of the tube 7.

I believe that I am the first to provide a liquid density meter which may be employed in connection with a liquid flow meter for obtaining an accurate measure of the quantity of liquid which flows thru a pipe or orifice in a given period of time. I do not intend to be limited to the precise details of construction shown and described.

The rheostat B shown in Figure 2 is preferably provided with a scale such for instance as indicated at 36 graduated in terms of fluid flow of pounds per unit of time or cubic feet per unit of time. It is apparent that this rheostat or indicator may be of the recording type such for instance as illustrated in Patent No. 965,824 granted July 26, 1910, or as indicated in Figure 7 so that a record may be made of the rate of flow and this record may be integrated in order to give a reading of the total pounds or cubic feet which have passed thru a given pipe in a given length of time. In Figure 7, I have shown means for integrating over a given period of time the fluid flow in pounds passing through the conduit.

The four resistances A, B, C, and D are placed in the arms of the Wheatstone bridge in the manner indicated in Figure 2 with the galvanometer G connected between resistances C and D and resistances A and B.

The galvanometer G is provided with a pair of contacts 35 and 36, with which the needle is adapted to make contact if it leaves the zero position. These contacts control the energization of solenoids 39 and 40 which operate to vary the resistance B to restore the balance of the bridge so that the galvanometer needle 37 is brought back to the zero position.

At the same time the values of the resistance B are integrated over a given period of time by the integrating mechanisms shown at the top of the figure. The conical friction wheel 41 is constantly rotated by means of the time controlled mechanism 42 and a small friction pulley 43 keyed to a shaft 44 is moved back and forth by means of the pinion 45 and the rack 46. The pinion 45 in turn is operated by means of the arm 47 which has the solenoid cores 48 and 49 connected thereto. Thus, in order to bring the resistance B to the proper value to restore the needle 37, one of the solenoids 48 and 49 is energized to turn the pinion 45 in the proper direction, whereby the shaft 44 is shifted axially. This shaft has a switching contact 50, which operates on the resistance B to include or exclude more or less resistance in accordance with the axial movement.

The shaft 44 is connected by means of a worm 51 to a suitable train of gears 52 of an integrating mechanism which gives an indication of the quantity of pounds which have passed through the pipe or conduit 1 in a given time.

The resistance B may be provided with a scale 53 which in cooperation with the pointer 50 will give a sight reading of the value of resistance at any particular time, and consequently this scale may be graduated in terms of pounds of liquid flowing per unit of time. It is, of course, apparent that the variations of the resistance 8 may be employed in a simple electric circuit either of the indicating or of the recording type for giving an indication or giving a record of the variations in density. It is also apparent that the employment of my invention does not depend upon an indicating or recording instrument being employed directly responsive to the variations in density only; as I have above explained this variation in density may be combined with other factors to give a reading on an indicator or a recording device which is the product of a number of factors.

In Figure 6, I have indicated a circuit in connection with the density control resistance $R_2$ for indicating directly the density of the liquid passing through the hydrometer. In this circuit, the resistance $R_2$ is arranged in a Wheatstone bridge adjacent a variable or compensating resistance R which is varied to maintain a constant proportionality between $R_2$ and R. The other arms of Wheatstone bridge contain resistances which may be of a predetermined ratio preferably 1 to 1. The variable resistance R is provided with an indicator 38 which indicates directly in terms of density of the liquid.

It is also to be understood that the resistance 8 need not be entirely enclosed within the inclined connecting tube 7 as such part of the resistance as is not subject to variations may be external to the inclined connecting pipe 7. The various values of resistance may be accurately determined mathematically and may be verified experimentally after it is once determined what the range of and order of the density to be measured will be.

The instrument of my invention is useful not only in measuring liquids, such as gasoline, as I have above indicated, but may be employed in measuring the flow of steam or air or similar elastic fluids thru pipes, as well as measuring liquids.

I claim:

1. In combination, a closed conduit for conveying a fluid at any desired pressure, an electrical resistance adapted to be controlled by variations of fluid density in said conduit, and means comprising a fluid piston having the static pressure applied on opposite sides thereof controlled by the density of the fluid in said conduit for varying said resistance.

2. In a device of the class described, an electric circuit containing a resistance, a closed conduit adapted to convey a fluid therethru at any desired pressure, means comprising a fluid piston having the static pressure applied on opposite sides thereof responsive to the density of fluid in said conduit for controlling said resistance and an indicator graduated in terms of fluid density controlled by the variations of said resistance.

3. In combination, a conduit adapted to convey a fluid, means for determining the rate of flow of fluid in terms of pressure difference, a resistance, means for varying said resistance in direct proportion to and by the pressure difference produced by flow, a second resistance, means independent of pressure difference for controlling said second resistance directly in proportion to the density of the fluid flowing therein and an electric circuit containing said resistances, and an indicator affected through said resistances by a function of the pressure difference and density and graduated in terms of the volume of fluid for measuring the fluid flowing in said conduit.

4. In combination, a conduit adapted to contain a liquid flowing therethru, a pair of vessels communicating with said conduit and with each other, said vessels having a connection at their upper ends, a connection running from the lower end of one vessel on an inclination to the corresponding end of the other vessel, a resistance for said inclined connection, a body of conducting fluid trapped in the bottom of one vessel and extending into said inclined connection and an electric circuit subject to the variations of resistance in accordance with variations in density of the fluid flowing through the conduit.

5. The method of measuring the density of a fluid flowing in a closed conduit under pressure which comprises balancing the weight of a known column of the fluid to be measured against a column of liquid of known density both columns being independently subjected to the pressure in the conduit, causing the balancing of said liquid to exert a force upon a column of conducting fluid and indicating the variations of said column of conducting fluid thru change of an electric resistance.

6. The method of measuring the density of a fluid flowing in a closed conduit under pressure which comprises balancing a column of the fluid of a given height against a column of liquid of known density both columns being independently subjected to the pressure in the conduit and causing the variation in position of the column of known density to give an indication of the density of the fluid and constantly changing the contents of the column of fluid to be measured.

7. In a device of the class described, a pair of vessels connected by an inclined tube, one of said vessels extending down to the lower end of said inclined tube and the upper end of the inclined tube communicating with the bottom of the other vessel, a body of mercury trapped in the bottom of the first vessel and extending into the inclined connection, a resistance wire for said inclined connection adapted to be affected by variations of the height of mercury in said inclined connection, a body of insulating liquid covering the mercury in the first body or vessel and a similar body of insulating liquid in the second vessel extending down to the level of the mercury in said connection, means for introducing liquid into the first vessel and means for withdrawing liquid from the second vessel in order to maintain a changing body of liquid, the density of which is to be measured in said vessels.

8. The method of measuring the density of a fluid flowing in a closed conduit under pressure which comprises causing said fluid to exert a definite force in accordance with its density, balancing said force with a varying column of mercury, said column of mercury being subjected to the pressure of the conduit in a direction opposite to the force exerted by the fluid and controlling an electric circuit in accordance with its variations to give an indication of the density of the fluid to be measured.

9. The method of measuring the quantity of fluid flowing thru a pipe which comprises causing velocity of flow to produce static pressure, controlling an electric resistance by said static pressure and directly in proportion thereto, measuring the density of the fluid flowing in said pipe by means of the variations of an electric resistance which is varied directly in proportion with density and combining said resistances in an electric circuit in such manner that a function of the ratio is indicated upon an indicator.

10. In combination, an indicator, a Wheatstone bridge controlling said indicator, one of the arms of said Wheatstone bridge being controlled by and directly proportional to the density of a fluid flowing in a pipe and another arm of said Wheatstone bridge being controlled by and directly proportional to the velocity of the same fluid flowing in said pipe, said indicator being graduated in terms corresponding to the quantity of liquid flowing in unit time.

11. In combination, a conduit adapted to convey a fluid, means for determining the rate of flow of fluid in terms of pressure difference, a resistance, means for varying said resistance directly in proportion to the pressure difference produced by flow, a second resistance, means operated by the weight of a fixed volume of said fluid for controlling said resistance directly in proportion to the density of the fluid flowing therein, an electric circuit containing said resistances, and an indicator affected through said resistances by a function of the pressure difference and density and graduated in terms of volume of fluid for measuring the fluid flowing in the conduit.

12. In combination, a conduit adapted to convey a fluid, means for determining the rate of flow of fluid in terms of pressure difference, a resistance, means for varying said resistance directly in proportion to the pressure difference produced by flow, a second resistance, means for controlling said resistance directly in proportion to the density of the fluid flow therein, an electric circuit containing said resistances and an indicator affected through said resistances by a function of the ratio of the pressure and density, and graduated in terms of volume of the fluid flowing in said pipe for measuring the said fluid flowing in said pipe or conduit.

13. The method of measuring the volume of fluid flowing through a pipe which comprises causing the velocity of flow to produce a static pressure difference, controlling an electric resistance by and in proportion to said static pressure difference, measuring the density of the fluid flowing in said pipe by means of and in proportion to the variations of an electric resistance and combining the said resistances in an electric circuit in such manner that a function of the ratio of said resistances is indicated upon an indicator.

14. In combination an indicator, a Wheatstone bridge controlling said indicator, one of the arms of said Wheatstone bridge being controlled by and in proportion to the density of liquid flowing in a pipe and another arm of said Wheatstone bridge being controlled by and in proportion to the velocity of the same fluid flowing in said pipe, said indicator being graduated in terms corresponding to the volume of liquid flowing in said pipe in unit time.

15. In combination, flow measuring means dependent upon the impact pressure of the fluid flowing, density measuring means controlled by the density of the fluid flowing, and means controlled jointly by both of said means for measuring the volume flowing per unit of time.

16. The method of measuring the density of a fluid which comprises causing said fluid to exert a definite force in accordance with its density, balancing said force with a varying column of mercury and, in addition, a column of fluid of a known density at the same pressure as the pressure of the fluid to be measured, and controlling an electric circuit in accordance with the variation of said column of mercury to give an indication of the density of the fluid to be measured.

17. In combination, a conduit adapted to contain a liquid flowing therethrough, a pair of vessels communicating with said conduit and with each other, said vessels having a connection at their upper end, a connection running from the lower end of one vessel on an inclination to the corresponding end of the other vessel, a body of fluid trapped in the body of one vessel and extending into said inclined connection, the level of said fluid in said connection varying in accordance with the variations in density of the fluid flowing through the conduit.

In witness whereof I hereunto subscribe my name this 12th day of June, 1919.

JULIUS M. NAIMAN.